(12) United States Patent
Wee

(10) Patent No.: US 11,425,467 B2
(45) Date of Patent: Aug. 23, 2022

(54) VIDEO-RELATED CHAT MESSAGE MANAGEMENT SERVER AND VIDEO-RELATED CHAT MESSAGE MANAGEMENT PROGRAM

(71) Applicant: Dae Sung Wee, Incheon (KR)

(72) Inventor: Dae Sung Wee, Incheon (KR)

(*) Notice: Subject to any disclaimer, the term of this patent is extended or adjusted under 35 U.S.C. 154(b) by 0 days.

(21) Appl. No.: 17/389,755

(22) Filed: Jul. 30, 2021

(65) Prior Publication Data
US 2022/0038783 A1 Feb. 3, 2022

(30) Foreign Application Priority Data
Aug. 3, 2020 (KR) .................. 10-2020-0096548

(51) Int. Cl.
*H04N 21/4788* (2011.01)
*H04L 51/046* (2022.01)
*H04L 65/612* (2022.01)

(52) U.S. Cl.
CPC ....... *H04N 21/4788* (2013.01); *H04L 51/046* (2013.01); *H04L 65/4084* (2013.01)

(58) Field of Classification Search
CPC .......... H04N 21/4788; H04N 21/47217; H04L 51/046; H04L 65/4084; H04L 51/10
See application file for complete search history.

(56) References Cited

U.S. PATENT DOCUMENTS

| 10,135,887 | B1* | 11/2018 | Esser | H04L 65/4015 |
| 2010/0287236 | A1* | 11/2010 | Amento | G06Q 10/10 |
| | | | | 709/204 |
| 2012/0311618 | A1* | 12/2012 | Blaxland | H04H 60/45 |
| | | | | 725/9 |
| 2014/0325557 | A1* | 10/2014 | Evans | H04N 21/4307 |
| | | | | 725/34 |
| 2017/0127136 | A1* | 5/2017 | Roberts | H04N 21/4788 |
| 2017/0249384 | A1* | 8/2017 | Kandylas | G06F 16/334 |
| 2021/0126958 | A1* | 4/2021 | Newton | H04N 21/26208 |

FOREIGN PATENT DOCUMENTS

| KR | 10-2010-0125996 A | 12/2010 | |
| KR | 10-2015-0013381 A | 2/2015 | |
| KR | 10-1540686 B1 | 8/2015 | |
| KR | 10-1777242 B1 | 9/2017 | |
| KR | 10-1867082 B1 | 6/2018 | |
| KR | 10-1933558 B1 | 12/2018 | |
| KR | 10-2020-0014487 A | 2/2020 | |
| WO | WO-2012129336 A1 * | 9/2012 | ............. G06F 16/78 |

OTHER PUBLICATIONS

Personal Blog "Introducing jsassist—chat window program for integrating Youtube, Twitch, and Daum Pot", Jan. 30, 2017, pp. 1-12.
KOBA daily news, May 23, 2019, pp. 1-32.

* cited by examiner

*Primary Examiner* — Caroline H Jahnige
(74) *Attorney, Agent, or Firm* — Sughrue Mion, PLLC

(57) ABSTRACT

A chat message management server is provided. The chat message management server may include a database for storing a chat message synchronized with a playback time of a specific video content played in at least one user terminal from among specific video contents provided from at least one video playback platform; and a chat message providing module that provides a chat message stored in the database such that the chat message is displayed in synchronization with the playback time of the specific video contents when the specific video contents are played back.

7 Claims, 11 Drawing Sheets

VIDEO-RELATED CHAT MESSAGE MANAGEMENT SERVER AND VIDEO-RELATED CHAT MESSAGE MANAGEMENT PROGRAM

BACKGROUND OF THE INVENTION

1. Field of the Invention

The present invention relates to a video-related chat message management server and a video-related chat message management program, and more specifically, to a video-related chat message management server and a video-related chat message management program, which can display a chat message synchronized with a playback time of a specific video content when the specific video content is played back.

2. Description of the Related Art

In recent years, networks, multimedia, communication terminals, platform technologies, etc. have rapidly developed, and video contents can be stored and utilized in a virtual space on a network called a cloud. Accordingly, users can enjoy various video contents anytime and anywhere, regardless of time, playback devices, or places.

As a streaming technique, which is one of techniques for transmitting and playing multimedia files such as videos, or a video transmission technique for transmitting a video in a chunk unit has been developed, a user can play back video contents while downloading the video contents or without downloading the video contents. As a result, consumption for video contents has greatly increased. In particular, due to the widespread propagation of wireless communication terminals such as smart devices, the consumption of video contents continues to increase exponentially even now. Accordingly, competition among video content providers that provide video contents is also getting fiercer.

Meanwhile, a user who consumes the video contents wants to share opinions or empathize with other users in real time through chat, rather than simply watching video contents unilaterally provided from a content provider.

However, if users who watch video contents want to chat or express their opinions, the users need to check the video contents while displaying the video contents till the end of the video contents, unlike text contents where users can check all the contents at once, so there is a problem in that the communication effect is relatively poor compared to the chat added to the contents consisting of the texts.

For example, if a chat message about the video contents that the users watch is displayed on a chat window, it is difficult for users to understand which part of the video contents corresponds to the opinion in the chat message. Even if the chat message contains a phrase specifying the playback position of the video contents, it is difficult to sympathize or share opinions with a chat message displayed on the chat window provided in the video contents unless the user intentionally accesses the specific playback position.

SUMMARY OF THE INVENTION

One technical object of the present invention is to provide a video-related chat message management server and a video-related chat message management program, which can display a chat message synchronized with a playback time of a specific video content when the specific video content is played back.

Another technical object of the present invention is to provide an open-type video-related chat message management server and an open-type video-related chat message management program, which have no restriction for a platform where video contents are uploaded or a player that plays back the video contents.

The technical object of the present invention is not limited to the above.

In order to achieve the above technical object, the present invention provides a video-related chat message management server.

According to an embodiment, the video-related chat message management server includes a database for storing a chat message synchronized with a playback time of a specific video content played in at least one user terminal from among specific video contents provided from at least one video playback platform; and a chat message providing module that provides a chat message stored in the database such that the chat message is displayed in synchronization with the playback time of the specific video contents when the specific video contents are played back.

According to an embodiment, the chat message providing module may include a chat message processing unit which is set to group at least two chat messages composed of a same phrase such that the grouped chat messages are displayed as one representative chat message, and which is set to display any one or a combination of a number and a mark representing a number of the grouped chat messages on one side of the one representative chat message.

According to an embodiment, the chat message providing module may include a video content processing unit which sets a plurality of time stamps displaying a location of the chat message displayed in synchronization with the playback time of the specific video contents on a screen of the specific video contents based on the playback time of the specific video contents.

According to an embodiment, the video content processing unit may be set to expose the chat message at a time point when any one of the time stamps is designated by a user who plays the specific video content.

According to an embodiment, the video content processing unit may be set to automatically expose the chat message whenever the specific video contents being played reach any one of the plurality of time stamps.

According to an embodiment, the video content processing unit may be set to delay-expose the chat message at a time point when the specific video contents being played reach any one of the plurality of time stamps, and differentially sets a delayed exposure time of the chat message according to at least one of a cumulative number of the chat message, a sentence length of the chat message, and a form of the chat message.

According to an embodiment, the database may store a plurality of specific video contents provided from a plurality of video playback platforms, respectively, and the chat message providing module may include a video synchronization unit for synchronizing screens of the plurality of specific video contents such that the screens match each other over time.

In addition, the present invention also provides a database.

According to an embodiment, the database may include: a receiving unit for receiving a chat message; and a storage unit that stores and manages the chat message by cumulatively integrating a second chat message into a first chat message when receiving the second chat message synchronized with a specific playback time of the specific video content from the receiving unit and also from a second video playback platform during a process of storing and managing the first chat message synchronized with a specific playback time of the specific video content from a first video playback platform.

Further, the present invention provides a video-related chat message management program stored in a medium to execute the steps as follows.

According to one embodiment, the chat message management program may be stored in a medium to execute the steps of: a login step in which a login unit is executed so that a user who has downloaded and installed a chat message management app provided from a video-related chat message management server or a user who has accessed a chat message management website provided from the chat message management server is allowed to login; a chat message receiving step in which a chat message receiving unit is executed to receive a chat message synchronized with a playback time of a specific video content from among specific video contents provided from at least one video playback platform, and to store the chat message in a database; and a chat message providing step in which a chat message providing unit is executed so that, when the specific video contents are played back, the chat message stored in the database is displayed in synchronization with the playback time of the specific video contents.

According to an embodiment of the present invention, there is provided a video-related chat message management server including a database for storing a chat message synchronized with a playback time of a specific video content played in at least one user terminal from among specific video contents provided from at least one video playback platform; and a chat message providing module that provides a chat message stored in the database such that the chat message is displayed in synchronization with the playback time of the specific video contents when the specific video contents are played back.

As described above, the present invention can provide a video-related chat message management server and a video-related chat message management program, in which users can be provided with a chat message synchronized with the playback time of the video contents, so the user and other users can share their feelings, thoughts, and opinions about a specific part of the video contents based on the playback time of the video contents so that the user satisfaction can be improved, and thus, the level of immersion and understanding for the corresponding video contents can be improved.

In addition, according to an embodiment of the present invention, an open-type video-related chat message management server and an open-type video-related chat message management program, which have no restrictions on the platform where the video contents are uploaded or the player that plays back the contents, can be provided.

DESCRIPTION OF THE EMBODIMENTS

Hereinafter, preferred embodiments of the present invention will be described in detail with reference to the accompanying drawings. However, the technical spirit of the present invention is not limited to the embodiments, but may be realized in different forms. The embodiments introduced herein are provided to sufficiently deliver the spirit of the present invention to those skilled in the art so that the disclosed contents may become thorough and complete.

When it is mentioned in the specification that one element is on another element, it means that the first element may be directly formed on the second element or a third element may be interposed between the first element and the second element. Further, in the drawings, a shape and a size are exaggerated for efficient description of the technical contents.

In addition, in the various embodiments of the present specification, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combinations thereof described in the specification are present, and are not to be understood as excluding the possibility that one or more other features, numbers, steps, elements, or combinations thereof may be present or added. In addition, the term "connection" used herein may include the meaning of indirectly connecting a plurality of components, and directly connecting a plurality of components.

Further, in the following description of the present invention, a detailed description of known functions or configurations incorporated herein will be omitted when it may make the subject matter of the present invention unnecessarily unclear.

FIGS. 1 to 10 are views for explaining a video-related chat message management server according to an embodiment of the present invention.

Figure 1:
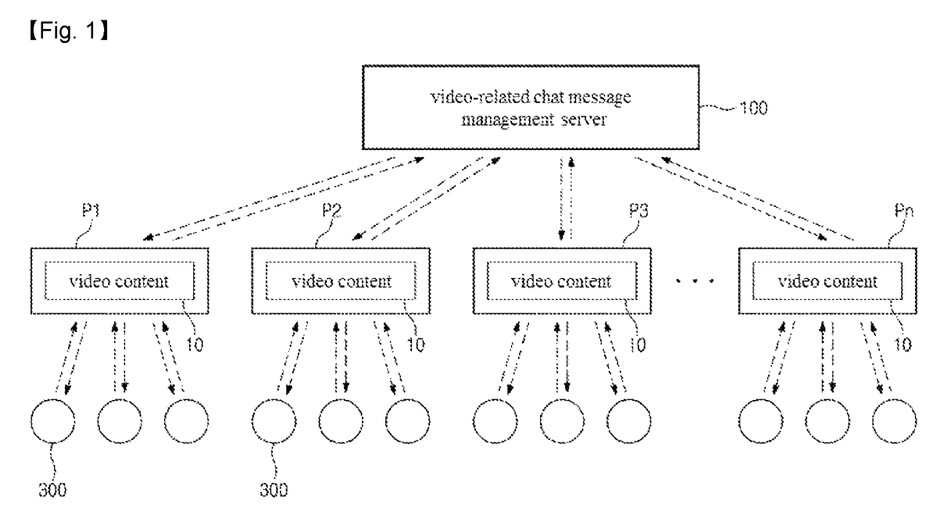
FIG. 1 is a reference view illustrating a video-related chat message management server according to an embodiment of the present invention, a plurality of video playback platforms connected to the server through a network, and a plurality of user terminals connected to the video playback platforms, respectively, through a network.

As shown in FIG. 1, a video-related chat message management server 100 according to an embodiment of the present invention may be connected to a plurality of video playback platforms P1, P2, P3 . . . , Pn, for example, YouTube, NAVER, Netflix, etc. through a network such as a wireless communication network. In this case, each of the plurality of video playback platforms P1, P2, P3 Pn may be connected to a plurality of user terminals 300 through a network such as a wireless communication network.

According to an embodiment of the present invention, it is assumed that specific video contents provided from at least one video playback platform P1, P2, P3 . . . , Pn is played back by at least one user terminal 300. The specific video contents may include, for example, a video file and a subtitle file. In this case, the user terminal 300 may produce a chat message file which is input while the video file is being played.

The video-related chat message management server 100 according to an embodiment of the present invention may provide the users with a chat message synchronized with a playback time of a specific video content 10 that is played back in at least one user terminal 300 from among specific video contents provided from the video playback platform and the player that plays back the video contents without restrictions for the platform (P; P1, P2, P3 . . . , Pn) where many and various video contents are uploaded or the player that plays back the video contents.

Figure 2:
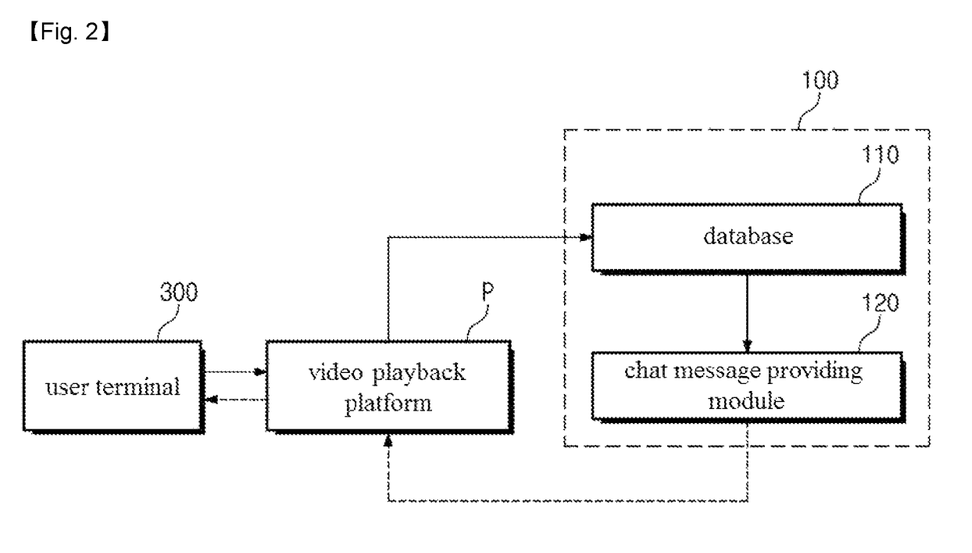
FIG. 2 is a block diagram illustrating a video-related chat message management server according to an embodiment of the present invention.

Referring to FIG. 2, for this purpose, the video-related chat message management server 100 according to an embodiment of the present invention may include a database 110 and a chat message providing module 120.

The database 110 may store a chat message synchronized with a playback time of a specific video content 10 played back in the at least one user terminal 300 from among the specific video contents 10 provided from the at least one video playback platform P. For this purpose, the database 110 may include a receiving unit for receiving the chat message. In this case, the chat message may include at least one chat message which is input from a plurality of users while the specific video content provided to a plurality of user terminals 300 from the video playback platform P is being played back.

The database 110 may include a storage unit that stores and manages the chat message by cumulatively integrating a second chat message into a first chat message when receiving the second chat message synchronized with a specific playback time of the specific video content 10 from the receiving unit and also from a second video playback platform P2 during a process of storing and managing the first chat message synchronized with a specific playback time point of the specific video content from a first video playback platform P1 among a plurality of video playback platforms (P; P1, P2, P3 Pn).

Figure 3:
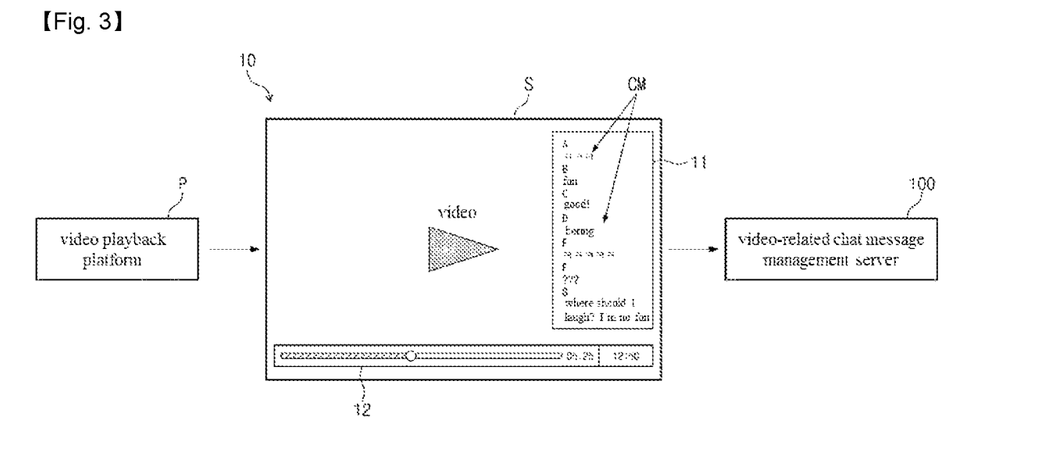
FIG. 3 is an exemplary view of a screen showing video contents according to an embodiment of the present invention.

Referring to FIG. 3, the specific video content 10 may be output through a screen S of the user terminal 300. A first chat window 11 may be provided on the right side of the screen S. A plurality of chat messages CM, which are inputted from a plurality of users watching the same video during the video is played back, may be displayed on the first chat window 11. For example, "ㅋㅋㅋ" (laughs, it could be "LOL" in English and American) input from a user with an ID of "A" at a specific time when the video is being played, "fun" input from a user with ID "B" at another specific time when the video is being played, and "good!" input from a user with ID "C" at the time when the video is being played may be displayed on the first chat window 11.

In this case, based on the video playback time, the chat message may be placed at the higher position in the first chat window 11 as the input time of the chat message is faster, and if too much chat messages CM are input beyond the display range of the first chat window 11, the chat message CM may be sequentially deleted from the top of the first chat window 11.

In addition, a seek bar 12 displaying the current playback time of the video content 10 may be provided on the lower end of the screen S.

However, this is only an example, and the screen S on which the video content 10 is played back may be provided to the user terminal 300 in various shapes, configurations, and designs.

However, it is difficult for the user who lately consumes the video content 10, in which the chat message CM input from the user who has already consumed the video content 10 is displayed on the screen S, to understand which part of the video content 10 corresponds to the opinion in the chat message CM displayed on the first chat window 11 during the playback type of the image content 10. Even if the chat message CM contains a phrase specifying the playback position of the video content, it is difficult to sympathize with the chat message CM displayed on the first chat window 11 exposed in the screen S of the video content 10 unless the user intentionally accesses the specific playback position.

In addition, after installing a chat message management app provided from the video-related chat message management server 100 in the user terminal 300, the user may play back the specific video content 10 through a dedicated player provided from the chat message management app or a player from a video playback platform P that is linked with the chat message management app, and may input the chat message CM for the corresponding video content 10.

In addition, after accessing a chat message management website provided from the video-related chat message management server 100 through the user terminal 300, the user may play back the specific video content 10 through a dedicated player provided from the chat message management app or a player from a video playback platform P that is linked with the chat message management app, and may input the chat message CM for the corresponding video content 10.

The database 110 may download and install the chat message management app provided from the video-related chat message management server 100 in the user terminal 300, or may further store user information provided from a visitor who accesses the chat message management website through the user terminal 300 to join a membership. In this case, the database 100 may encrypt and store such user information.

Referring again to FIG. 2, the chat message providing module 120 may be configured such that the chat message CM stored in the database 110 can be displayed in synchronization with a playback time of the specific video content 10 when the specific video content 10 is played back.

Figure 4:
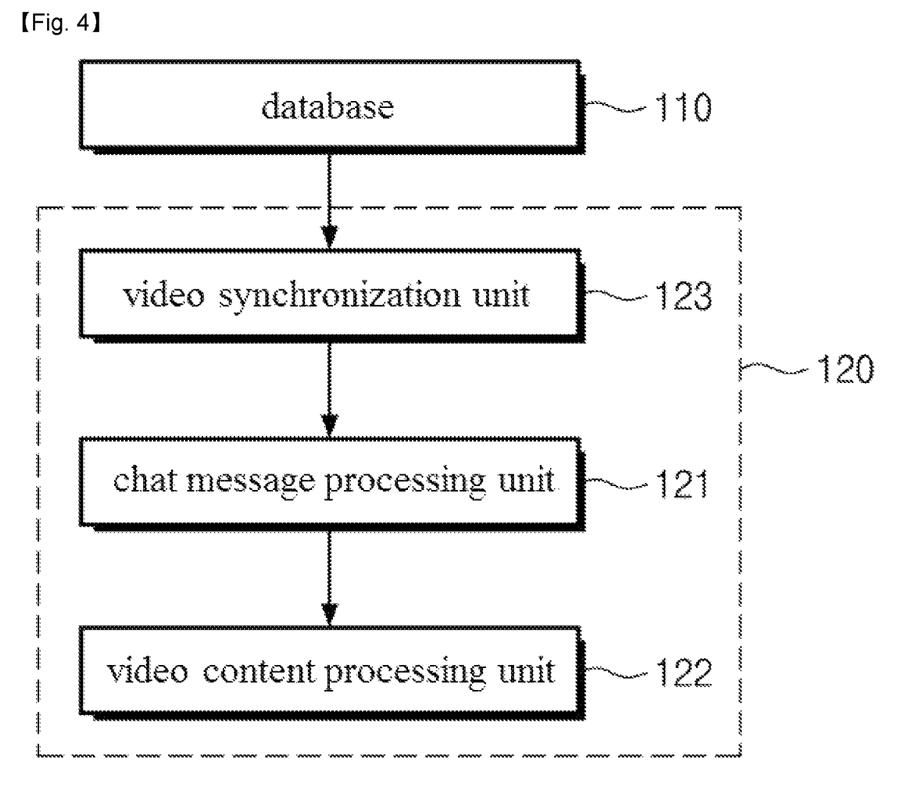
FIG. 4 is a block diagram illustrating a chat message providing module of a video-related chat message management server according to an embodiment of the present invention.

Referring to FIG. 4, the chat message providing module 120 according to an embodiment of the present invention may include a video synchronization unit 123, a chat message processing unit 121, and a video content processing unit 122.

In an embodiment, the database 110 may store video files of a plurality of specific video contents 10 provided from each of a plurality of video playback platforms (P; P1, P2, P3 . . . , Pn). In this case, the plurality of video files stored in the database 110 may have mutually different playback times due to advertisement insertion or the like.

The video synchronization unit 123 may synchronize the screens S of the plurality of video files to match over time.

Figure 5:
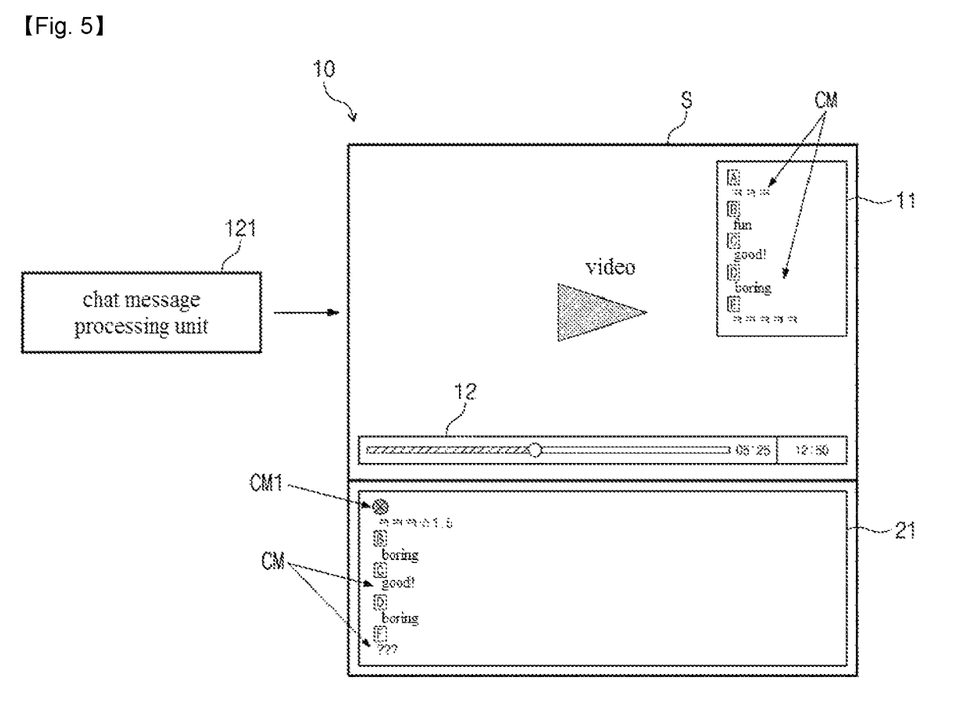
FIG. 5 is an exemplary view illustrating a screen for explaining a chat message processing unit of a chat message providing module according to an embodiment of the present invention.

Referring to FIGS. 4 and 5, the chat message processing unit 121 may be set to group at least two chat messages CM composed of the same phrase such that the grouped chat messages may be displayed as one representative chat message CM1 when there are so many chat messages CM input at the specific time from among the chart messages CM synchronized with the playback time of the specific video content 10 stored in the database 110.

For example, the chat message processing unit 121 may be set to display the representative chat message CM1 "ㅋㅣㅋㅣㅋㅣ" by grouping the chat messages CM displayed at the playback time of the video content 10 when the chat messages CM contain many phrases having the same type or meaning such as "ㅋㅋㅋ", "ㅋ", and "ㅋㅋㅋㅋㅋ". In this case, if there are many phrases of "ㅋㅣㅋㅣㅋㅣ", it means that many users sympathize with a specific scene played back at a specific time of the video content 10, so it is necessary to display this situation. Accordingly, the chat message processing unit 121 may set to display any one or a combination of a number and a mark representing a number of the grouped chat messages on one side of the one representative chat message CM1.

For example, the chat message processing unit 121 may be set to add "☆1.5" to one side of the grouped representative chat message CM1 "ㅋㅣㅋㅣㅋㅣ" such that the representative chat message CM1 can be displayed in the form of "ㅋㅣㅋㅣㅋㅣ☆1.5".

Here, "☆" may be a mark indicating that the corresponding phrase is grouped, and "1.5" may be a mark indicating that 150 identical or similar phrases are grouped.

However, this is only an example, and the representative chat message CM1 may be set to be displayed in various forms such that the user can intuitively recognize how many chat messages CM are grouped in the displayed representative chat message CM1.

Figure 6:
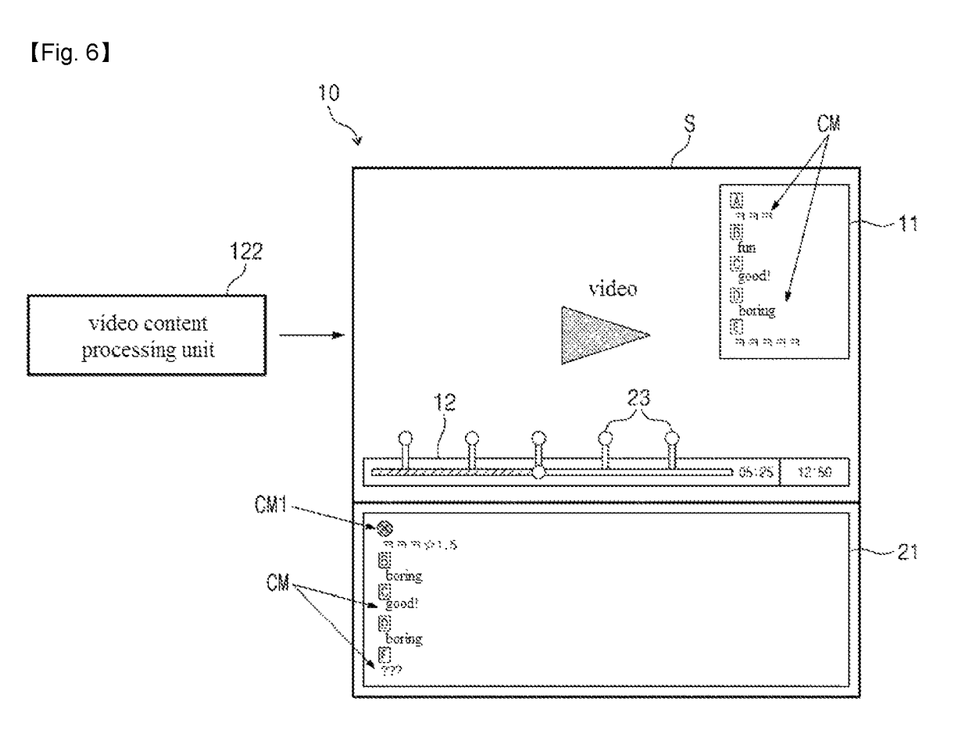
FIG. 6 is an exemplary view showing a screen for explaining a video content processing unit of a chat message providing module according to an embodiment of the present invention.

Referring to FIGS. 4 and 6, the video content processing unit 122 may set a plurality of time stamps 23, which indicate the location of the chat messages CM displayed in synchronization with the playback time of the image content 10, on the screen S of the video content 10 based on the playback time of the video content 10.

The video content processing unit 122 may set the plurality of time stamps 23 on the seek bar 12 such that the time stamps 23 can be visually recognized. Accordingly, when the video content 10 being played back reaches any one of the time stamps 23, the chat messages CM1 and CM synchronized thereto may be displayed on the lower end of the screen S.

In an embodiment, a second chat window 21 exposed when the video content 10 being played back reaches any one of the time stamps 23 may be provided at the lower end of the screen S of the video content 10. The second chat window 21 may display chat messages CM1 and CM synchronized with a specific playback time of the video. For example, the representative chat message CM1 "ㅋㅋㅋ" synchronized with 5 minutes and 25 seconds when the video is being played back may be displayed in the second chat window 21. The representative chat message (CM1) may be provided by grouping "ㅋㅣㅋㅣㅋㅣ" which is input from a user with ID "A" and synchronized with 5 minutes and 25 seconds when the video is being played back and "ㅋㅋㅋㅋㅋ" which is input from a user with ID "E" and synchronized with 5 minute and 25 seconds when the video is being played back.

In addition, "fun" which is input from a user with ID "B" and synchronized with 5 minutes and 25 seconds when the video is being played, "good!" which is input from a user with ID "C" and synchronized with 5 minutes and 25 seconds when the video is being played, "boring" which is input from a user with ID "D" and synchronized with 5 minutes and 25 seconds when the video is being played, and "???" which is input from a user with ID "E" and synchronized with 5 minutes and 25 seconds when the video is being played may be displayed on the second chat window 21.

In addition, "5 minutes and 25 seconds" exemplified here may be a time designated by the user or an automatically set time. In this manner, the second chat window 21 may display a set time only at a time designated by the user or automatically set, and may be hidden after the set time has elapsed.

That is, even if the video content 10 being played back reaches any one of the time stamps 23, the chat message CM may not be displayed on the lower end of the screen S depending on the user's setting.

Figure 7:
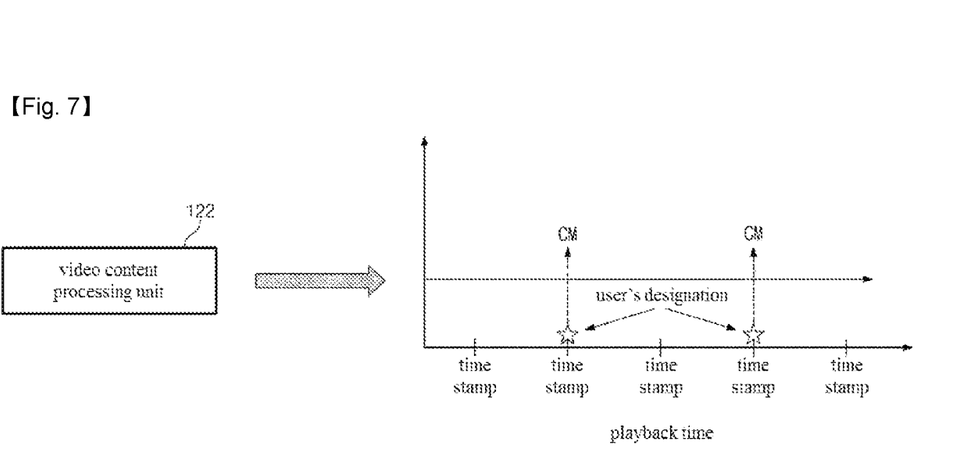
FIG. 7 is a reference view for explaining a video content processing unit according to an embodiment of the present invention, which is set to expose a chat message when a video content being played reaches a time stamp designated by a user.

Referring to FIG. 7, the video content processing unit 122 according to an embodiment of the present invention may be set such that the chat message CM can be displayed at a lower end of the screen S when any one of the time stamps 23 is designated by a user watching the video content 10.

For example, when the second and fourth times tamps 23 are designated based on the playback time of the video content 10 by the user watching the video content 10, the video content processing unit 122 may be set such that the chat message CM can be displayed on the lower end of the screen S when the video content 10 being played back reaches the second and fourth time stamps 23.

In other words, when the second and fourth time stamps 23 are designated by the user who watches the video content 10 based on the playback time of the video content 10, the video content processing unit 122 may be set such that the chat message CM is not displayed on the lower end of the screen S when the video content 10 being played back reaches the first, third and fifth time stamps 23.

As a modified example, the video content processing unit 122 may be set such that the speed of the chat message that scrolls quickly may become slow down when the user's finger approaches the first chat window 11 provided on the right side of the screen S or a cursor of a mouse is positioned in the first chat window 11. Accordingly, the user can read the chat message CM.

In this case, the video content processing unit 122 may be set such that, when the user touches the first chat window 11 provided on the right side of the screen S with the user's finger or clicks the first chat window 11 with a mouse, the chat message CM input at the corresponding time can be displayed on a second chat window 21 provided on the lower end of the screen S.

Figure 8:
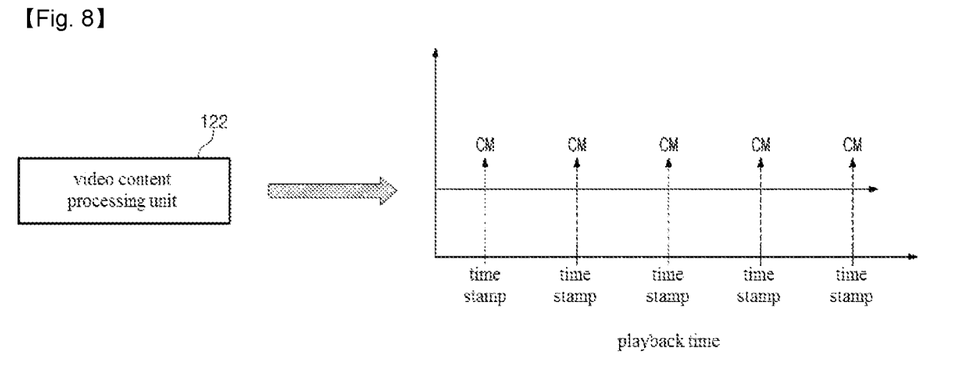
FIG. 8 is a reference view for explaining a video content processing unit according to an embodiment of the present invention, which is set to automatically expose a chat message whenever a video content being played reaches a preset time stamp.

In addition, referring to FIG. 8, the video content processing unit 122 according to an embodiment of the present invention may be set such that the chat message CM can be automatically displayed on the screen S whenever the video content 10 being played back reaches any one of the time stamps 23.

For example, the video content processing unit 122 may set five time stamps 23 in the video content 10, and in this case, the video content processing unit 122 may be set such that the chat message CM can be automatically displayed on the screen S whenever the video content 10 sequentially reaches the five time stamps 23 in an order of the playback time of the video content 10.

According to one embodiment of the present invention, the video content processing unit 122 may set the time stamp 23 at the playback time of the video content CM synchronized with a relatively large number of chat messages CM from among the chat messages CM synchronized with each playback time of the video content 10 being played. This is because if there are many chat messages CM at a specific playback time of the video content 10, it means that many users feel and sympathize with many emotions in the corresponding scene.

Therefore, there is a high possibility that individual users who watch the video content 10 also want to know the opinions of other users in the corresponding scene to sympathize with the opinions. Therefore, if the chat message CM is set to be automatically exposed on the screen S whenever the video content 10 being played back reaches any one of the plurality of time stamps 23 by the video content processing unit 122, the satisfaction of the user watching the video content 10 may be improved. In addition, since the user can view the chat message CM that is automatically exposed without taking a separate action or motion, it is possible to improve immersion and understanding of the video content 10.

The video content processing unit 122 may insert a QR code into the screen S of the video content 10 to be produced. Accordingly, the user may photograph the QR code inserted into the screen S of the video content 10 through the chat message management app downloaded in the user terminal 300, and the input chat message CM can be automatically synchronized with the specific playback time of the video content 10 linked with the QR code.

Figure 9:
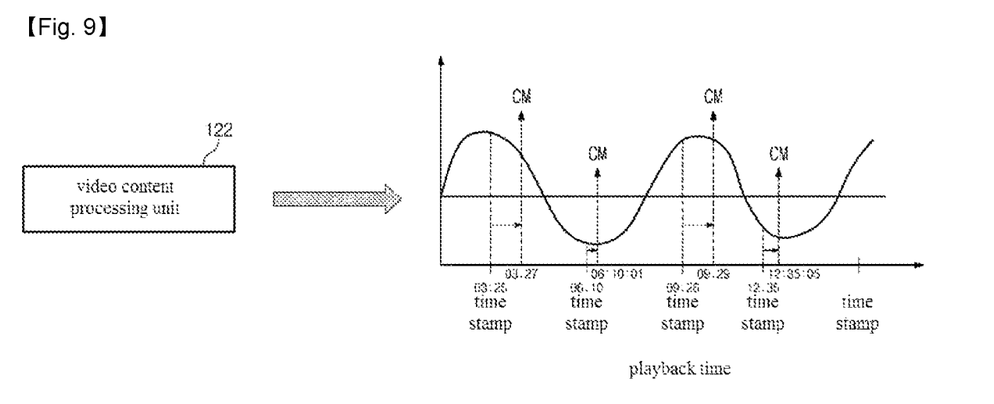
FIG. 9 is a reference view for explaining a video content processing unit according to an embodiment of the present invention, which is set to delay-expose a chat message when a video content being played reaches a preset time stamp.
Figure 10:
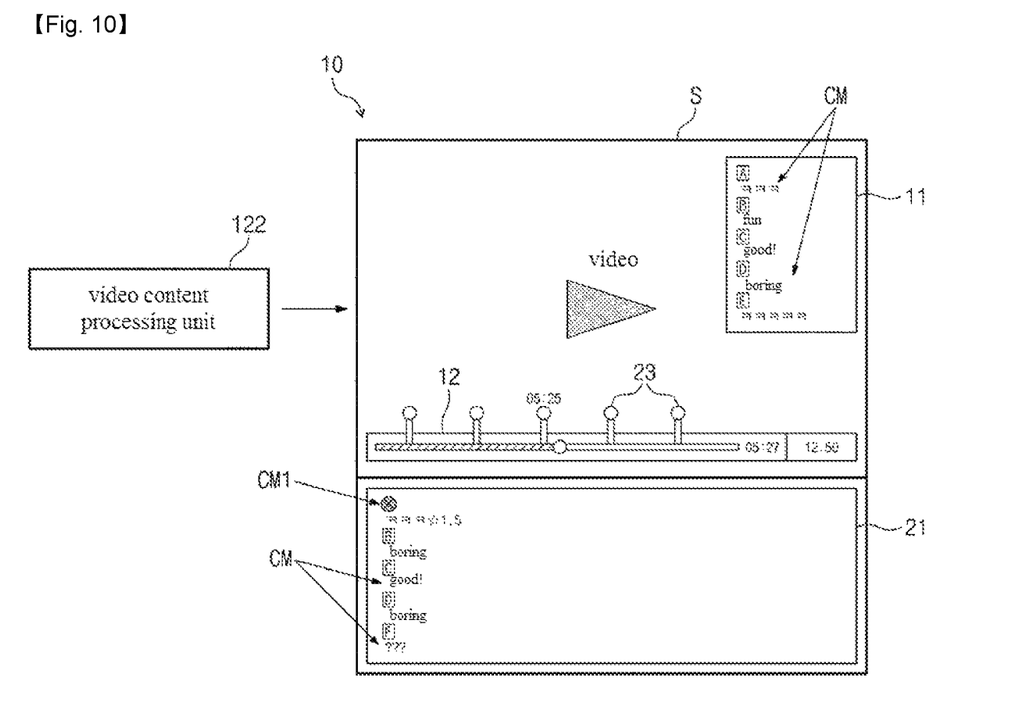
FIG. 10 is an exemplary view illustrating a screen for explaining a video content processing unit according to an embodiment of the present invention, which is set to delay-expose a chat message when a video content being played reaches a preset time stamp.

Referring to FIGS. 9 and 10, the video content processing unit 122 according to an embodiment of the present invention may be set such that the chat message CM can be exposed with delay when the video content 10 being played back reaches any one of a plurality of time stamps 23.

In an embodiment, the video content processing unit 122 may differentially set the delayed exposure time of the chat message CM according to the accumulated number of the chat messages CM.

For example, when the video content 10 is a movie, emotions are highest at the climax, and many opinions may be present on this part.

In the graph of FIG. 9, the curve represents the emotional changes of the viewer while the movie is being played. For example, if the human emotion reaches the maximum value at 3 minutes and 25 seconds of the movie playback time and the time stamp 23 is set at the above time, the video content processing unit 122 may be set such that the chat message CM can be displayed on the screen S at 3 minutes and 27 seconds which is delayed from the above time by 2 seconds.

Here, the reason for delaying the exposure of the chat message CM is that it is difficult to catch the text when the emotion reaches the climax. Accordingly, in an embodiment of the present invention, the chat message CM is set to be displayed on the screen S at the point when the emotion descends from the peak, so the interruption to the user's immersion by the displayed chat message CM can be minimized.

Meanwhile, if the time stamp 23 is set at 6 minutes and 10 seconds at which the human emotion is lowest, the video content processing unit 122 may be set such that the chat message CM can be displayed on the screen S at a time delayed by 0.01 second.

That is, the video content processing unit 122 according to an embodiment of the present invention may calculate a person's emotional change based on the amount of chat messages CM accumulated at a specific time, and accordingly, it is possible to increase the user's satisfaction by differentially setting the delayed exposure time of the chat messages CM displayed on the screen S.

As another example, the video content processing unit 122 may differentially set the delayed exposure time of the chat message CM according to the sentence length of the chat message CM synchronized with the playback time of the video content 10.

For example, when the chat message CM is mostly composed of simple symbols, marks, and short sentences such as "ㅋㅋㅋ", "!!!", "wow!", and "nice", the video content processing unit 122 may set the delayed exposure time of the chat message CM relatively shorter than when the message CM is mostly composed of long texts.

For example, when the chat message CM is mostly composed of simple symbols, marks, and short sentences, the video content processing unit 122 may be set such that the chat message CM can be exposed at a time delayed, for example, by about 0.1 second from the time when the video content 10 being played back reaches the time stamp 23.

In addition, when the chat message CM is mostly composed of long sentences, the video content processing unit 122 may be set such that the chat message CM can be exposed at a time delayed, for example, by about 2 seconds from the time when the video content 10 being played back reaches the time stamp 23.

As described above, the video-related chat message management server 100 according to an embodiment of the present invention may provide the chat message CM synchronized and displayed at the playback time of the specific video content 10 to a plurality of video playback platforms P1, P2, P3 . . . , Pn. Accordingly, the users may access any one of the plurality of video playback platforms P1, P2, P3 . . . , Pn through the user terminal 300 and watch the specific video content 10 uploaded in the platforms. In addition, at a specific time when the specific video content 10 is being played back, the user and other users may share the feel, think, and opinion about a specific scene of the video content 10 while watching the chat message CM displayed on the screen S. As a result, the user who watches the video content 10 may have a high degree of immersion and understanding of the video content 10, and can ultimately feel a high level of satisfaction. As described above, according to an embodiment of the present invention, the video-related chat message management server 100 capable of increasing the user satisfaction may be provided.

Hereinafter, a video-related chat message management program according to an embodiment of the present invention will be described with reference to FIG. 11.

Figure 11:
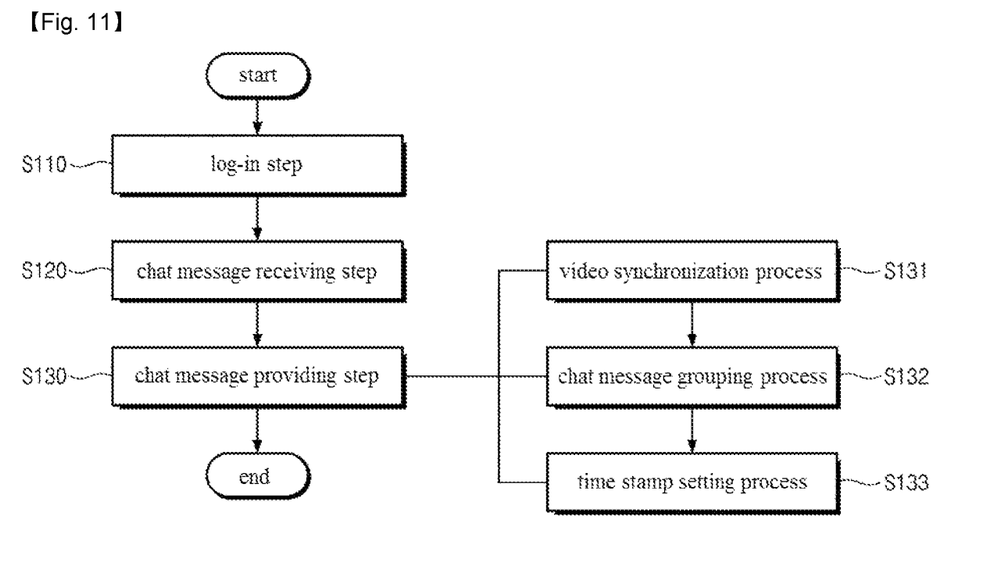
FIG. 11 is a flowchart illustrating a video-related chat message management program according to an embodiment of the present invention.

FIG. 11 is a flowchart illustrating a video-related chat message management program according to an embodiment of the present invention. In this case, reference numerals for each configuration refer to FIGS. 1 to 10.

Referring to FIG. 11, the video-related chat message management program according to an embodiment of the present invention can be stored in a medium to execute the log-in step (S110), the chat message receiving step (S120), and the chat message providing step (S130).

First, in the log-in step (S110), a login unit may be executed so that a user who has downloaded and installed a chat message management app provided from a video-related chat message management server 100 or a user who has accessed a chat message management website provided from the chat message management server 100 is allowed to login.

Next, in the chat message receiving step (S120), a chat message receiving unit may be executed to receive a chat message CM synchronized with a playback time of a specific video content 10 from among specific video contents 10 provided from at least one video playback platform P, and to store the chat message in a database 100.

Next, in the chat message providing step (S130), a chat message providing unit is executed so that, when the specific video contents 10 are played back, the chat message CM stored in the database 100 may be displayed in synchronization with the playback time of the specific video contents 10.

For this purpose, in the chat message providing step (S130), the chat message providing unit may execute a video synchronization process (S131), a chat message grouping process (S132), and a time stamp setting process (S133).

First, in the video synchronization process (S131), the chat message providing unit may match playback screens S of video files of a plurality of specific video contents 10, which are provided from a plurality of video playback platforms (P; P1, P2, P3 . . . , Pn), with each other over time.

Next, in the chat message grouping process (S132), the chat message providing unit may be set such that one representative chat message CM1 can be displayed by grouping at least two chat messages (CM) composed of the same phrase when too many chat messages CM are input at a specific time from among the chat messages CM synchronized with the playback time of the specific video content 10 stored in the database 110.

Then, in the time stamp setting process (S133), the chat message providing unit may set a plurality of time stamps 23 indicating locations of the chat message, which is synchronized and displayed at the playback time of the video content 10, in the screen S of the video content 10 based on the playback time of the video content 10.

In this case, the chat message providing unit may set the time stamp 23 at the playback time of the video content 10 to which relatively many chat messages CM are synchronized from among the chat messages CM synchronized with each playback time of the video content 10 being displayed.

Meanwhile, the chat message providing unit may be set such that the chat message CM can be displayed on the lower end of the screen S whenever any one of the time stamps 23 is designated by the user watching the video content 10, or the chat message CM can be automatically on the screen S whenever the video content 10 being played back reaches any one of the plurality of time stamps 23.

In addition, the chat message providing unit may set such that the chat message CM can be exposed with a delay when the video content 10 being played back reaches any one of the plurality of time stamps 23.

For example, the chat message providing unit may differentially set the delayed exposure time of the chat message CM according to the accumulated number of the chat messages CM. In addition, the chat message providing unit may differentially set the delayed exposure time of the chat message CM according to the sentence length of the chat message CM synchronized with the playback time of the video content 10.

According to an embodiment of the present invention, the user terminal 300 may be a smartphone or a tablet PC, and the video-related chat message management server 100 may be stored in the smartphone and tablet PC, and implemented in the form of an application to carry out the above steps.

The video-related chat message management program according to an embodiment of the present invention may be applied and driven in any electronic device. For example, the video-related chat message management program according to an embodiment may be applied and driven in a smart phone.

Although the invention has been described in detail with reference to exemplary embodiments, the scope of the present invention is not limited to a specific embodiment and should be interpreted by the attached claims. In addition, those skilled in the art should understand that many modifications and variations are possible without departing from the scope of the present invention.

What is claimed is:

1. A video-related chat message management server comprising:
    a memory for storing a chat message synchronized with a playback time of a specific video content played in at least one user terminal from among specific video contents provided from at least one video playback platform; and
    at least one processor to implement a chat message providing module that provides a—the chat message stored in the memory such that the chat message is displayed in synchronization with the playback time of the specific video contents when the specific video contents are played back,
    wherein the chat message providing module includes a video content processing unit which sets a plurality of time stamps indicating when the chat message is to be exposed in synchronization with the playback time of the specific video contents, and
    wherein the video content processing unit is configured to, when the playback time of the specific video contents reaches any one of the plurality of time stamps, differentially delay an exposure time of the chat message based on a cumulative number of the chat message such that chat messages having a relatively larger cumulative number are further delayed than chat messages having a relatively smaller cumulative number.

2. The video-related chat message management server of claim 1, wherein the chat message providing module includes a chat message processing unit which is configured to group at least two chat messages composed of a same phrase such that the grouped chat messages are displayed as one representative chat message, and which is configured to display any one or a combination of a number and a mark representing a number of the grouped chat messages on one side of the one representative chat message.

3. The video-related chat message management server of claim 1, wherein the video content processing unit is configured to expose the chat message at a time point when any one of the time stamps is designated by a user who plays the specific video content.

4. The video-related chat message management server of claim 1, wherein the video content processing unit is configured to automatically expose the chat message whenever the specific video contents being played reach any one of the plurality of time stamps.

5. The video-related chat message management server of claim 1, wherein the video content processing unit is further differentially delay the exposure time of the chat message according to at least one of a sentence length of the chat message, and a form of the chat message.

6. The video-related chat message management server of claim 1, wherein the memory stores a plurality of specific video contents provided from a plurality of video playback platforms, respectively, and the chat message providing module includes a video synchronization unit for synchronizing screens of the plurality of specific video contents such that the screens match each other over time.

7. A non-transitory computer-readable recording medium having a video-related chat message management program for executing steps of:

allowing a user who has downloaded and installed a chat message management application provided from a video-related chat message management server or a user who has accessed a chat message management website provided from the chat message management server to login;

receiving a chat message synchronized with a playback time of a specific video content from among specific video contents provided from at least one video playback platform;

storing the chat message in a database; and when the specific video contents are played back, controlling the chat message stored in the database to be displayed in synchronization with the playback time of the specific video contents, wherein the controlling includes:

setting a plurality of time stamps indicating when the chat message is to be exposed in synchronization with the playback time of the specific video contents; and when the playback time of the specific video contents reaches any one of the plurality of time stamps, differentially delaying an exposure time of the chat message based on a cumulative number of the chat message such that chat messages having a relatively larger cumulative number are further delayed than chat messages having a relatively smaller cumulative number.

* * * * *